United States Patent [19]

Pober

[11] Patent Number: 4,578,456

[45] Date of Patent: Mar. 25, 1986

[54] ETHOXYLATED LIGNITE COMPOSITION AND METHOD OF PREPARING

[75] Inventor: Kenneth W. Pober, Houston, Tex.

[73] Assignee: NL Industries, Inc., New York, N.Y.

[21] Appl. No.: 599,449

[22] Filed: Apr. 12, 1984

[51] Int. Cl.[4] .............................. C07G 1/00; C10C 1/20
[52] U.S. Cl. ........................................ 530/502; 208/44
[58] Field of Search ............................ 530/502; 208/44

[56] References Cited

U.S. PATENT DOCUMENTS 3,149,085  9/1964  Ball et al. .............................. 530/502
4,116,811  9/1978  Schaefer et al. ....................... 208/44

OTHER PUBLICATIONS

Chem. Abstr., vol. 92, (1980) 183385w.

*Primary Examiner*—Delbert R. Phillips
*Attorney, Agent, or Firm*—Browning, Bushman, Zamecki & Anderson

[57] ABSTRACT

Novel, ethoxylated lignites which exhibit excellent water solubility as well as solubility in organic liquids are obtained by ethoxylating lignite at elevated temperatures using various weight ratios of ethylene oxide to lignite, the ethoxylation being conducted using an alkali metal alkylate catalyst in a solvent which is generally inert under reaction conditions.

12 Claims, No Drawings

ETHOXYLATED LIGNITE COMPOSITION AND METHOD OF PREPARING

BACKGROUND OF THE INVENTION

The present invention relates to the ethoxylation of lignite and more particularly to a method of ethoxylating lignite to produce ethoxylated lignites which are soluble and/or dispersible in water and/or polar organic compounds.

SUMMARY OF THE INVENTION

It is an object of the present invention to provide a novel composition of matter comprising ethoxylated lignite.

Another object of the present invention is to provide a method of ethoxylating lignite to produce ethoxylated lignite products.

The above and other objects of the present invention will become apparent from the description given herein and the appended claims.

In one aspect of the present invention, there is provided a method of ethoxylating lignite wherein lignite containing less than about 3.5% by weight water is reacted with ethylene oxide in the presence of an alkali metal alkylate catalyst and an inert reaction solvent. The reaction is conducted in a substantially oxygen-free atmosphere using an ethylene oxide-to-lignite weight ratio of from about 2 to 1 to about 100 to 1. The catalyst, which is preferably sodium methylate, is used in an amount of from about 1 to about 75% by weight based on the weight of the lignite. The reaction is preferably conducted at an elevated temperature, e.g. from about 130° C. to 170° C.

The present invention also provides a new ethoxylated lignite (EOL) product produced according to the above-described method.

In still another embodiment, the present invention provides a novel composition of matter comprising ethoxylated lignite (EOL) containing from 4.55 to 227 ethoxy groups per 100 grams of lignite.

DESCRIPTION OF THE PREFERRED EMBODIMENTS

The term "lignite" as used herein is intended to mean and include coals intermediate between peat and bituminous coal and specifically includes brown coal. While the present invention is applicable to all forms of lignite, a particularly useful type of lignite for the method and compositions of the present invention is Leonardite. Leonardite is a soft, earthy, medium brown coke-like substance associated with lignitic outcrops in North Dakota. Leonardite is frequently referred to as "slack" because of its texture.

The lignite used in the method and in preparing the compositions of the present invention is dry lignite, i.e. lignite, which has been treated, as by heating, to reduce the moisture content to about 3.5% by weight or less and preferably to about 2% by weight or less. As is known, the moisture content of lignite, as mined, can range up to 70% by weight but is usually between 20 and 60% by weight. Thermal drying of lignite to reduce this moisture content can be carried out in well known methods such as by contact with super heated steam, convection drying, in combination of the two methods or by other means. In carrying out the method of the present invention, it is preferred that the lignite be in a particular form. While particle size is generally unimportant, it is preferred that the lignite have a particle size such that greater than 97% by weight will pass through an 80 mesh screen while greater than 55% by weight will pass through a 200 mesh screen.

The catalyst which is used in the method of the present invention is an alkali metal alkylate, sometimes referred to as alkali metal alkoxides, such as sodium methoxides, potassium methylate, etc. The preferred catalyst, because of ready availability, is sodium methylate. In preparing the novel ethoxylated lignites according to the method of the present invention, the amount of catalyst employed will range from about 1 to about 75% by weight based on the weight of dry lignite used. Preferably, the amount of catalyst employed will be about 50% by weight based on the weight of dry lignite.

In the method of the present invention to prepare the novel ethoxylated lignites, the amount of ethylene oxide employed will be such as to provide a weight ratio of ethylene oxide to lignite of from about 2:1 to about 100:1, most preferably from about 5:1 to about 30:1.

The method of the present invention is conducted in a solvent which will not cause hydrolysis of the catalyst and is generally, under reaction conditions, unreactive toward ethoxylation so as to avoid competing side reactions. Thus, the solvent must, generally speaking, be inert in the sense that it does not react with the catalyst or any of the reactants nor engage in deleterious side reactions which would hinder the reaction between the lignite and the ethylene oxide. Nonlimiting examples of suitable solvents include $C_6$-$C_{12}$ liquid aromatic hydrocarbons such as, for example, the xylenes, triethylbenzenes and the like. Generally speaking, the amount of solvent employed will be such that the combined weight of the lignite and ethylene oxide reactants will be such as to constitute from about 11 to about 40% by weight of the total reaction charge. It will be understood that the term "solvent" as used herein is not intended to imply that any or all of the reactants are solublized. Indeed, neither the preferred sodium methylate catalyst nor lignite have any appreciable solubility in liquids such as xylene. Accordingly, the reaction mixture at the start of the reaction is generally a slurry comprised of the lignite, the catalyst, the solvent and the ethylene oxide.

The method of the present invention is preferably carried out at an elevated temperatures and, more generally, at a temperature ranging from about 130° C. to about 170° C., most preferably about 150° C. Pressure is relatively unimportant and can range from about 32 to about 200 psi. While higher temperatures may be employed, it has been found that when the reaction temperature is below 130° C., the rate of ethoxylation becomes too slow to have any practical utility.

The novel composition produced according to the present invention comprises an ethoxylated lignite having the general formula:

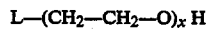

where L is lignite and $4.55 \leq X \leq 227/100$ g L. Thus, the ethoxylated lignite composition of the present invention is a lignite which contains from 4.55 to 227 ethoxy groups per 100 g of lignite.

In the method of the present invention, preferably the lignite-catalyst-solvent slurry is first prepared and admixed at a temperature of about 150° C. and for a time of from about 30 to about 90 minutes prior to any addition of ethylene oxide. This premixing of the lignite, catalyst and solvent prior to addition of the ethylene oxide is, like the reaction process itself, conducted in the substantial absence of oxygen. To accomplish this, the reaction vessel is purged with an inert gas such as nitrogen, helium, etc. Following the premixing, the ethylene oxide is then added to the reaction vessel and the ethoxylation of the lignite carried to the desired degree of completeness depending on the relative amounts of lignite and ethylene oxide employed. It has been found that at a 20:1 weight ratio of ethylene oxide to lignite, essentially complete conversion, i.e. ethoxylation, is achieved in a typical batch reaction. The use of less than a 20:1 weight ratio of ethylene oxide to lignite, while resulting in a useful product, leads to a mixture of ethoxylated lignite product plus incompletely reacted lignite.

The ethoxylated lignite, depending on the weight ratio of ethylene oxide to lignite employed in the reaction, ranges from a relatively hard solid to a liquid, all of which are water soluble and/or dispersible and are also water soluble and/or dispersible in a wide range of solvents ranging from polar organic liquids to aromatic hydrocarbons, the latter at elevated temperature. The ethoxylated lignites of the present invention are generally insoluble in alkanes such as hexane, pentane and the like.

To more fully illustrate the present invention, the following non-limiting examples are presented. In the following examples, the ethoxylation of lignite was conducted in a 600 ml Parr bomb equipped with an air-motor drive. The bomb was fitted with an electric heating jacket activated by a temperature controller. The temperature controller was also used to activate a solenoid valve which controlled tap water flow through a heat exchanger coil within the vessel. Temperature was detected and recorded using a single probe dual channel thermocouple. The vessel pressure was monitored by a capacitance-type pressure transducer. The reaction bomb was equipped with an addition tube which could be used to introduce the inert, purge gas as well as the ethylene oxide reactant.

EXAMPLE 1

A series of ethoxylated lignites was prepared using various ethylene oxide/lignite weight ratios, various solvents, various catalysts, etc. In conducting the various runs, the reaction vessel was charged with dry lignite, i.e lignite containing less than about 3.5% by weight water, catalyst (50% by weight based on amount of dry lignite) and solvent. The reaction vessel was reassembled and the system pressurized three times with nitrogen following which the system was evacuated. Following this purging, a 4-6 psi blanket of nitrogen was left in the reaction vessel. The reactants were stirred at 600-900 rpm for about one hour at a temperature which was controlled at about 150° C. After the one hour base equilibration period, approximately 30 gm of ethylene oxide was introduced into the reactor. Depending on the degree of ethoxylation, additional 30 gm charges of ethylene oxide were made. The data for a series of runs is shown in Table 1 below. The data from thermogravimetric analysis on several selected samples is shown in Table 2 below.

TABLE 1

| Run No. | Solvent | Catalyst | Temp. | EO/L Ratio | Yield % EOL Product ABS[a] | BOR[b] | Total Run Time (hrs) |
|---|---|---|---|---|---|---|---|
| 1 | 88/12 IPA[c]/H$_2$O | 50% aq. NaOH | 25-135° | 30 g/12 g | 0 | — | 2 |
| 2 | 88/12 IPA/H$_2$O | 50% aq. NaOH | 25-135° | 120/12 | 0 | 0 | 2.57 |
| 3 | Xylene | NaOMe | 135° | 30/12 | —[d] | — | 4.9 |
| 4 | 88/12 IPA/H$_2$O | 50% aq. NaOH | 178° | 152/6 | —[d] | — | 4.4 |
| 5 | Xylene | NaOMe | 138-148° | 150/6 | 20 | — | 6.2 |
| 6 | Xylene | NaOMe | 138-150° | 150/6 | 97 | 97 | 9.27 |
| 7 | Xylene | BF$_3$ | 150-170° | 100/6 | 0 | — | 10.7 |
| 8 | Xylene | BF$_3$ | 170° | 150/6 | 0 | — | 13.5 |
| 9 | Xylene | NaOMe | 150° | 150/6 | 95 | 95 | 4.5[e] |
| 10 | Xylene | NaOMe | 150° | 150/6 | 95 | 95 | 9.3[e] |
| 11 | Xylene | NaOMe | 150° | 150/6 | 96 | 96 | 7.01 |
| 12 | Xylene | NaOMe | 150° | 120/6 | 69 | 69 | 7.1 |
| 13 | Xylene | NaOMe | 150° | 90/6 | 67 | — | 8.07 |
| 14 | Xylene | NaOMe | 150° | 60/6 | 56 | — | 6.6 |
| 15 | Xylene | NaOMe | 150° | 180/6 | 98 | 98 | 3.47 |
| 16 | Xylene | NaOMe | 150° | 90/18 | 76 | 91 | 3.67 |
| 17 | Xylene | NaOMe | 150° | 90/18 | 75 | 88 | 3.67 |
| 18 | Xylene | NaOMe | 150° | 30/6 | — | — | 3.6 |
| 19 | Xylene | NaOMe | 150° | 30/6 | 60 | 74 | 3.07 |
| 20 | Xylene | NaOMe | 150° | 30/6 | 63 | 80 | 3 |

[a]Absolute yield
[b]Yield based on recovered, convertible material
[d]Ethoxylated lignite produced, not able to calculate amount
[e]No base equilibration period
[c]Isopropyl alcohol

TABLE 2

| Run No. | EO/L Ratio | Product Form | Weight Loss (%) at: °C. | | | | |
|---|---|---|---|---|---|---|---|
| | | | 210° | 260° | 310° | 360° | 800° |
| 16 | 5/1 | Liquid | 2.0 | 9.0 | 46 | 95 | 98 |
| 14 | 10/1 | Liquid | 11 | 13.5 | 20 | 92 | 99 |
| 13 | 15/1 | Liquid | 9.8 | 14 | 28 | 74 | 99 |
| 12 | 20/1 | Greasy Wax | 2.0 | 2.0 | 7.0 | 88 | 95.5 |
| 6 | 25/1 | Waxy Solid | 0.5 | 4.0 | 15 | 37 | 99 |
| 15 | 30/1 | Solid | 0.5 | 5.0 | 18 | 70 | 96 |

EXAMPLE 2

A dry, 600 ml stainless steel Parr bomb was charged with 350 ml of reagent grade xylene and 6 gm of lignite (−80 mesh, 99%; −140 mesh, 70%; −270 mesh, 32%). The raw lignite, which initially contained 20-25% moisture, was previously dried by xylene azeotropic removal of water until the water content was about 1.86% by weight. Next, 3.0 gm (0.55 mol) of sodium methoxide (95%) was added to the lignite/xylene slurry. The steel reactor was closed and the reactor flushed with nitrogen. The reactor contents were heated up to 150° C. with stirring at 600-900 rpm. After one hour of stirring at 150° C. (basic equilibration), ethylene oxide (150 gm, 3.14 mols) was admitted in five equal portions over 7.5 hours. It was noted that each addition of ethylene oxide was characterized by minor temperature drop upon addition and a fast return to 150° C. Upon addition of each charge of ethylene oxide, the pressure increased immediately and over a period of 1 to 1½ hours returned to equilibrium indicating that the added ethylene oxide had reacted. When pressure had stabilized after the last ethylene oxide charge, the reactor was allowed to cool down to ambient temperature. A dark brown, homogenous reaction mixture was filtered to remove traces of grit and unreacted ash. The bulk of the solvent was removed by flash evaporation, the last traces of solvent being removed by heating the brown liquid product oil on a hot plate. The product, cooled to ambient temperature, afforded 152.1 gm (97.5% yield) of a brown, waxy solid having a melting point of 30°-33° C. A comparison of the composition of the product and the starting lignite is given in Table 3 below.

TABLE 3

| Product | Starting Lignite |
|---|---|
| % C: 52.60 | 38.42 |
| % H: 8.54 | 4.60 |
| % O: 36.00 | 39.31 |
| % H$_2$O: 1.74 | 20.10 |
| % Ash: 1.37 | 18.67 |
| | % N: 0.92 |
| | % S: 1.60 |

The brown, amorphous product exhibited greater than 95% water solubility which is pH independent. The product is also soluble in polar organic liquids and aromatic hydrocarbons. It was found that aqueous solutions of the product, which appear to be colloidal, would plug filters. The product had a cloud point (H$_2$O) of greater than 100° C. at a 5% concentration.

Spectroscopic and thermal analysis of the product showed the following:

Ultraviolet: end absorption only, 220 nm;
Infrared: —OH(3400 cm$^{-1}$, broad); C—H stretch (2800-2950 cm$^{-1}$); C—O(broad, 1050-1150 cm$^{-1}$); doublet at 1350 cm$^{-1}$.

The infrared analysis is consistent with what would be expected of an ethoxylated lignite.

The TGA showed the following:

| TEMP: | 210° C. | 260° | 350° C. | 380° | 600° C. |
|---|---|---|---|---|---|
| % Loss: | 0.5% | 4.0% | 34% | 49% | 99% |

EXAMPLE 3

The same reactor used in the previous example was charged with 300 ml of xylene, 6 gm of lignite and 3.0 gm of sodium methoxide. The moisture content of the raw lignite had previously been reduced from 20-25% to 3.23% by azeotropic distillation with xylene. Prior to the introduction of the ethylene oxide, the xylene/lignite/catalyst slurry was stirred for one hour at 150° C. at 600-900 rpms. Ethylene oxide was then added in two separate 30 gm charges two hours apart. The total reaction time was 4.4 hours. The resulting crude reaction mixture contained a dark brown liquid product phase and a sponge-like solid phase. Filtration of the crude reaction mixture resulted in the recovery of 44.2 gm of a xylene-wet, spongy dark brown solid. Xylene solvent was removed from the filtrate by evaporation, the last traces of solvent being removed on a hot plate. There remained 36.8 gm (56% yield, estimated greater than 95% yield based on recovered solids) of an ethoxylated lignite product. This fluid, dark brown oil was completely water soluble.

With particular reference to the data in Table 1, stirring of the lignite-catalyst-xylene slurry prior to reaction with the ethylene oxide impacts the final product (compare, for example, Run 6 with a solid product vs. Runs 9 and 10 with liquid products). It can also be seen that the moisture content of the lignite must be reduced to below about 3.5% or less as free or available water converts the sodium methoxide to sodium hydroxide thereby rendering the catalyst ineffective (compare Run 3 with Runs 19-20). It can also be seen that while sodium methoxide is an effective catalyst, sodium hydroxide or boron trifluoride etherate are not (compare Runs 4, 7, 8 and 6). It can also be seen that the selection of a solvent which lends to the hydrolysis of the catalyst (see Runs 1, 2 and 4) results in the formation of little or no ethoxylated lignite product.

It can be seen from the data above that the present invention provides both a novel method of preparing ethoxylated lignites and novel ethoxylated lignite compositions. The ethoxylated lignites thus produced have utility in aqueous based drilling and well servicing fluids as clay beneficiants, as thinners in salt, e.b. calcium, contaminated drilling muds, as high temperature thinners and fluid loss control agents and as emulsion breakers.

The foregoing disclosure and description of the invention is illustrative and explanatory thereof, and various changes in the method steps may be made within the scope of the appended claims without departing from the spirit of the invention.

I claim:

1. A method of ethoxylating lignite comprising:
reacting lignite containing less than about 3.5% by weight water, in a substantially oxygen-free atmosphere, with ethylene oxide in the presence of an alkali metal alkylate catalyst and an inert reaction solvent, said ethylene oxide and said lignite being present in a weight ratio of ethylene oxide to lignite of from about 2:1 to about 100:1, said catalyst being present in an amount of from about 1 to about 75% by weight based on the weight of said lignite, said lignite and said ethylene oxide being present in a combined amount of from about 11.5 to about 39% by weight of the total weight of said lignite, said ethylene oxide and said solvent, said reacting being carried out at a temperature of about 130° C. or greater.

2. The method of claim 1 wherein said lignite comprises Leonardite.

3. The method of claim 1 wherein said lignite contains less than about 2% by weight water.

4. The method of claim 1 wherein said lignite is present in a particulate form having a particle size such that greater than 97% by weight passes through an 80 mesh screen and greater than 55% by weight passes through a 200 mesh screen.

5. The method of claim 1 wherein the weight ratio of ethylene oxide to lignite is from about 5:1 to about 30:1.

6. The method of claim 1 wherein said alkali metal alkalate catalyst comprises sodium methylate.

7. The method of claim 1 wherein said catalyst is present in an amount of about 50% by weight based on the weight of said lignite.

8. The method of claim 1 wherein said reacting is carried out in a temperature range of from about 130° C. to about 170° C.

9. The method of claim 8 wherein said reacting is carried out at a temperature of about 150° C.

10. The method of claim 1 wherein said solvent comprises a liquid, aromatic $C_6$ to $C_{12}$ hydrocarbon.

11. The method of claim 1 wherein said lignite, said catalyst and said solvent are admixed at a temperature of from about 130° C. to about 170° C. for a time from about 30 to about 90 minutes prior to addition of said ethylene oxide.

12. The ethoxylated lignite product produced by the method of any of claims 1–11.

* * * * *